(12) United States Patent
Fang et al.

(10) Patent No.: US 8,269,917 B2
(45) Date of Patent: Sep. 18, 2012

(54) OPTICAL FILM AND LIQUID CRYSTAL DISPLAY UTILIZING THE SAME

(75) Inventors: Chien-Chung Fang, Miao-Li County (TW); Wen-Hao Wu, Miao-Li County (TW); Xiao-Hong Jing, Guang-Dong (CN)

(73) Assignees: Innocom Technology (Shenzhen) Co., Ltd., Shenzhen, Guangdong Province (CN); Chimei Innolux Corporation, Chu-Nan, Miao-Li County (TW)

( * ) Notice: Subject to any disclaimer, the term of this patent is extended or adjusted under 35 U.S.C. 154(b) by 403 days.

(21) Appl. No.: 12/720,639

(22) Filed: Mar. 9, 2010

(65) Prior Publication Data

US 2011/0051028 A1    Mar. 3, 2011

(51) Int. Cl.
   *G02F 1/1335* (2006.01)
(52) U.S. Cl. .......................................................... 349/64
(58) Field of Classification Search ..................... 349/64
   See application file for complete search history.

(56) References Cited

U.S. PATENT DOCUMENTS

| 6,760,157 | B1 | 7/2004 | Allen et al. | |
| 7,918,599 | B2 * | 4/2011 | Chang | 362/615 |
| 2007/0182880 | A1 * | 8/2007 | Yamada | 349/61 |
| 2009/0051851 | A1 * | 2/2009 | Horiuchi et al. | 349/64 |

* cited by examiner

*Primary Examiner* — Timothy L Rude
(74) *Attorney, Agent, or Firm* — Muncy, Geissler, Olds & Lowe, PLLC

(57) ABSTRACT

An optical film includes an outer surface, a plurality of protrusions protruding from the outer surface and extending substantially parallel to a first axis, a plurality of grooves formed at neighboring protrusions; and two barrier members arranged at opposite sides of the optical film substantially parallel to a second axis. The first axis is substantially perpendicular to the second axis. The two barrier members prevent each slot from communicating with the exterior of the optical film continuously.

6 Claims, 7 Drawing Sheets

“OPTICAL FILM AND LIQUID CRYSTAL DISPLAY UTILIZING THE SAME”

BACKGROUND

1. Technical Field

The present disclosure generally relates to liquid crystal displays, and particularly, to an optical film and a liquid crystal display utilizing the film.

2. Description of Related Art

An optical film is often used in a liquid crystal display to adjust the brightness of the display.

A commonly used optical film, such as a prism sheet, a brightness enhancement film, a light guide plate, or other, often includes a plurality of prism bars parallel to each other and a plurality of grooves formed therebetween. A liquid crystal display often includes a plurality of optical films superposed on each other. When an optical film superposes on another optical film, a plurality of tubules are formed between the neighboring optical films accordingly. A capillary action may appear if the tubules communicate directly with the exterior and moisture may gather at the edge of the optical film and extend therealong by capillary action. As a result, the screen of the liquid crystal display may exhibit white lines, thereby negatively influencing the display quality.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
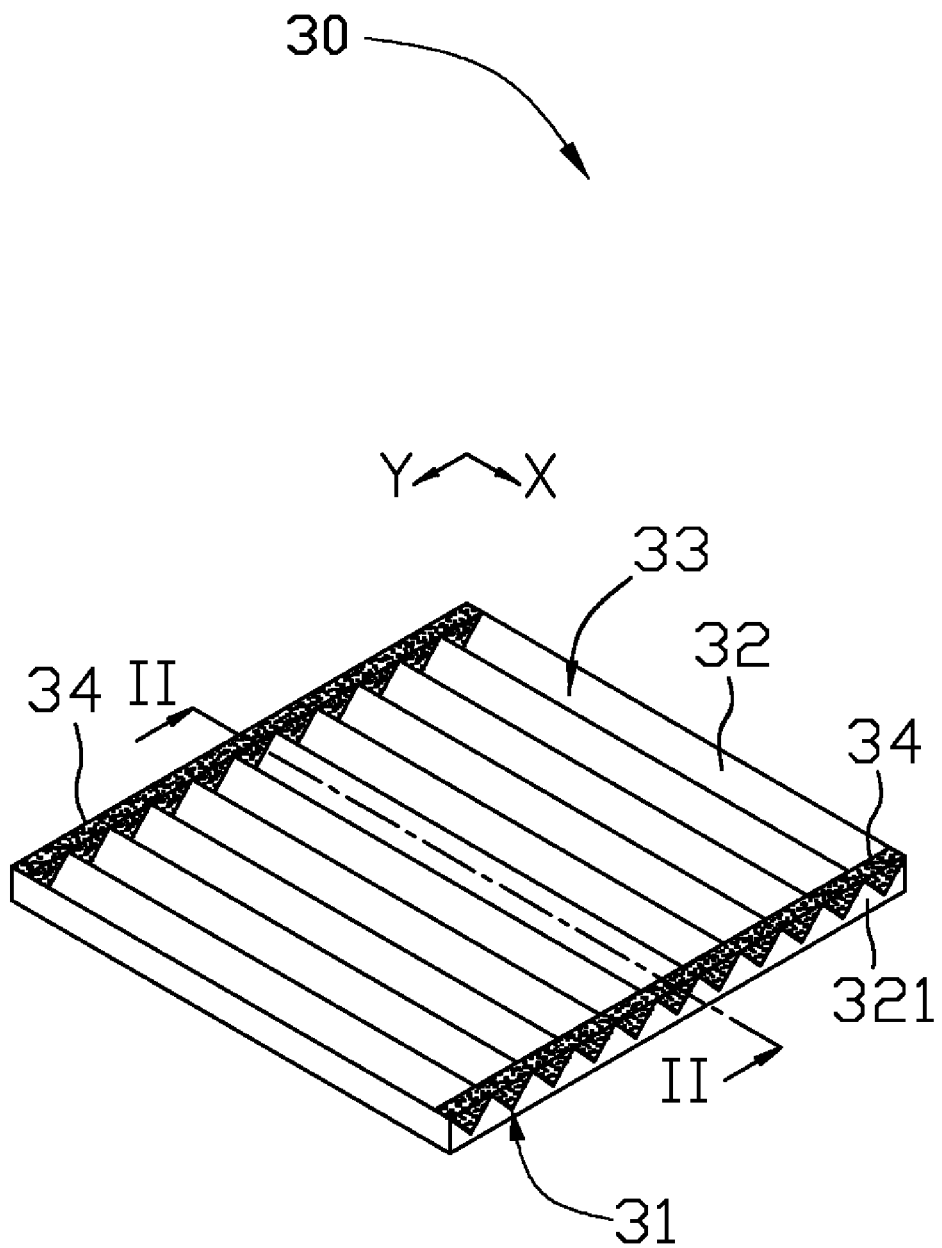
FIG. 1 is an assembled, isometric view of an optical film of a first embodiment.
Figure 2:
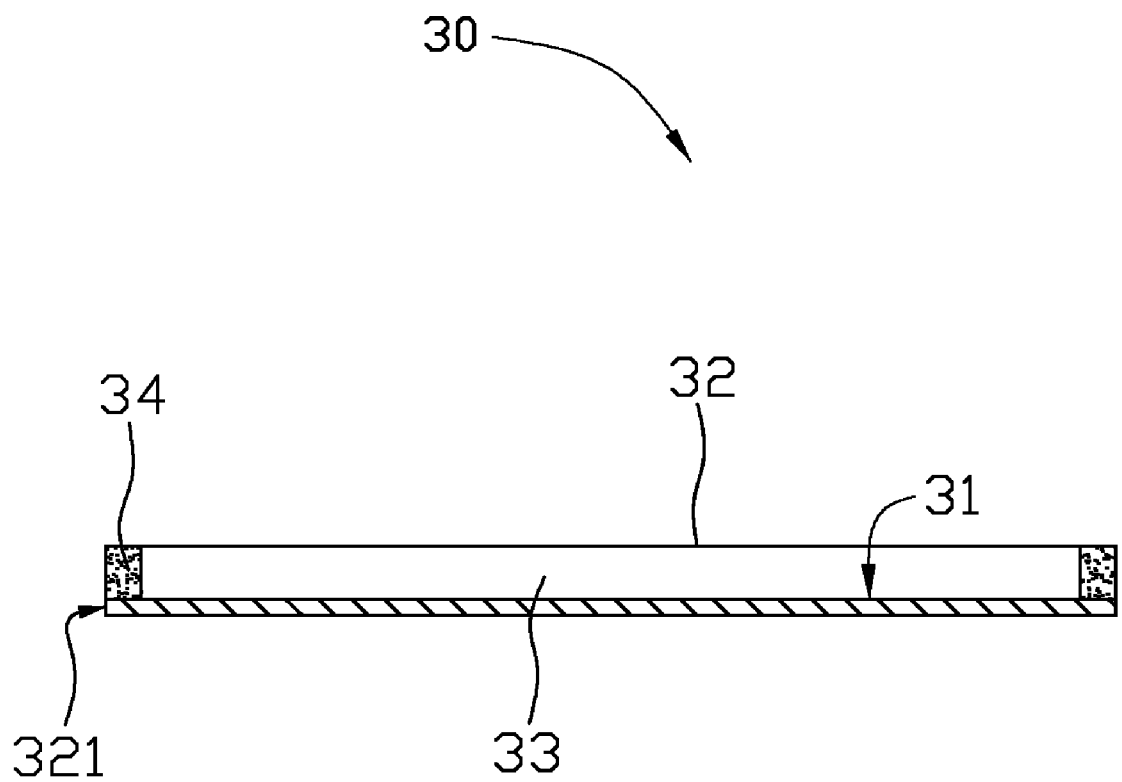
FIG. 2 is a cross-section of the optical film of FIG. 1 taken along line II-II.

Referring to FIGS. 1 and 2, a first embodiment of an optical film 30 includes an outer surface 31, a plurality of protrusions 32 protruding therefrom, a plurality of grooves 33 formed between neighboring protrusions 32, and two barrier members 34. The protrusions 32 are substantially parallel and extend parallel to a first axis (X-axis). The optical film 30 further includes two side surfaces 321 at opposite sides of the optical film 30 substantially parallel to a second axis (Y-axis), substantially perpendicular to the first axis (X-axis).

The barrier members 34 are arranged on opposite sides of the optical film 30 substantially parallel to the second axis (Y-axis). The barrier members 34 are filled into the opposite ends and enclose the ends of each groove 33 of the optical film 30. No capillary action is generated in the optical film 30 as a result of moisture (not shown) gathering at the edge of the optical film 30. The barrier members 34 may be integrally formed with the optical film 30, and are made of plastic, coating, or printed material. The barrier members 34 may alternatively be of independent members and of adhesive material.

Figure 3:
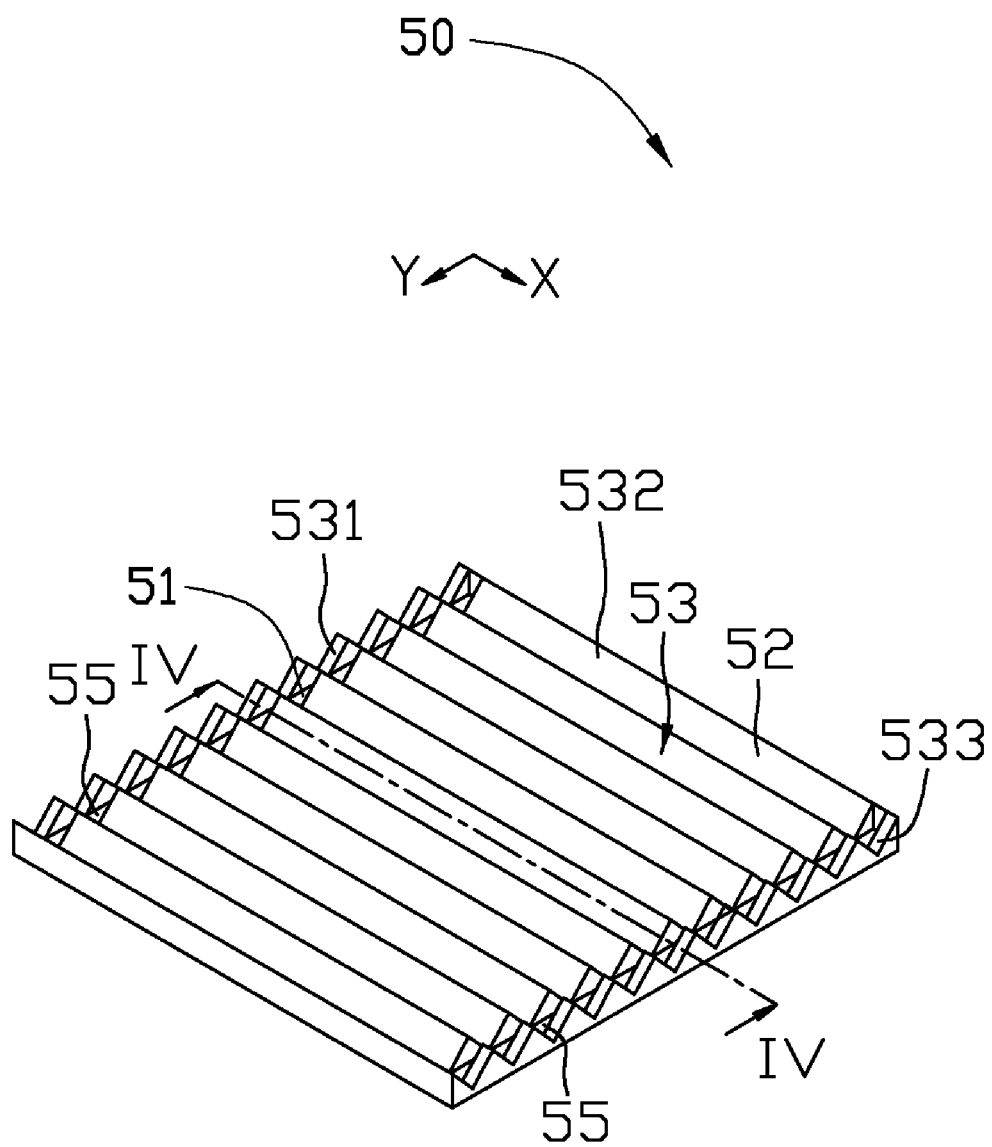
FIG. 3 is an assembled, isometric view of an optical film of a second embodiment.
Figure 4:
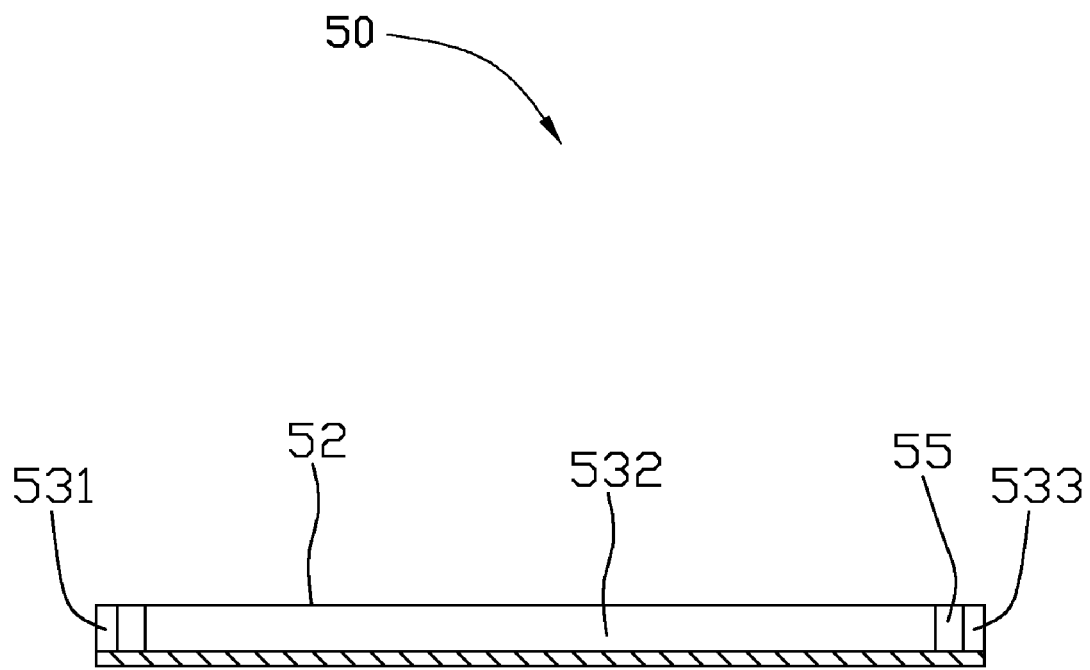
FIG. 4 is a cross-section of the optical film of FIG. 3 taken along line IV-IV.

Referring to FIGS. 3 and 4, a second embodiment of an optical film 50 differs from the optical film 30 of the first embodiment only with respect to the structure of the barrier member 55 is disclosed.

The barrier members 55 are slots defined at two ends of the protrusions 52. Each barrier member 55 extends substantially parallel to the second axis (Y-axis). The barrier members 55 divide each groove 53 of the optical film 50 into three portions 531, 532, 533, respectively, with the portion 532 located between the portions 531 and 533.

Moisture (not shown) gathering at the edge of the optical film 50 may enter into the grooves 53 of the optical film 50 from the portion 531 or the portion 533, but the barrier member 55 located therebetween prevents direct communication with the exterior, and thus no capillary action is generated and the gathered moisture remains at the portion 531 or the portion 533, having no negative effect on the display.

Figure 5:
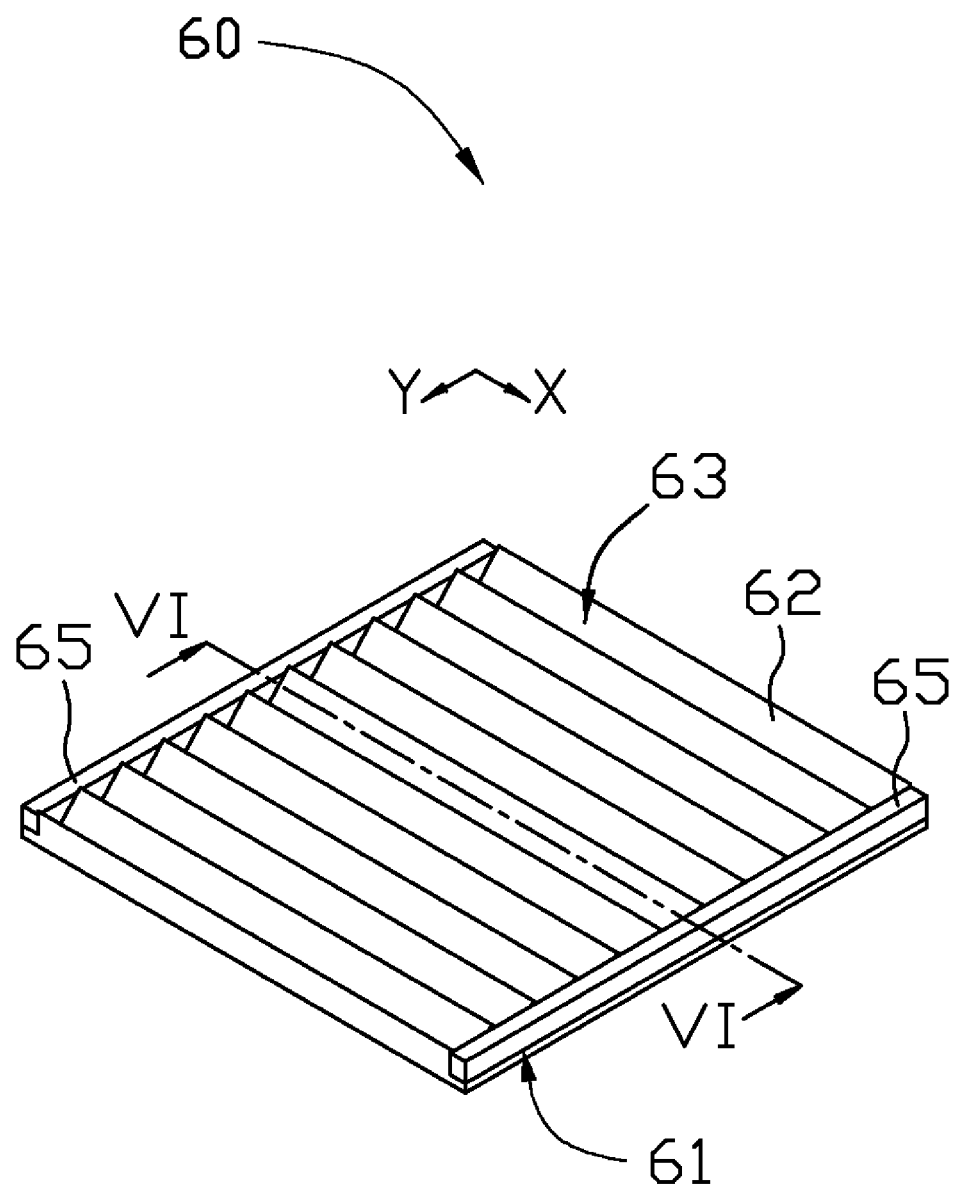
FIG. 5 is an assembled, isometric view of an optical film of a third embodiment.
Figure 6:
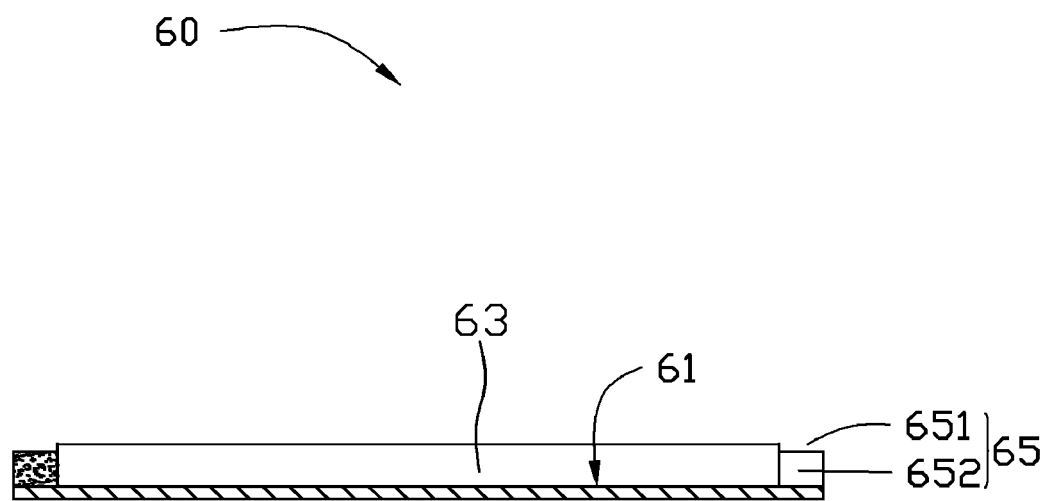
FIG. 6 is a cross-section of an optical film of FIG. 5 taken along line VI-VI.

Referring to FIGS. 5 and 6, a third embodiment of an optical film 60 differs from optical film 30 of the first embodiment only with respect to the structure of barrier member 65 is disclosed.

The barrier members 65 are arranged at two sides of each protrusion 62 along the second axis (Y-axis). Each barrier member 65 includes an opening 651 extending along the second axis (Y-axis) and a filling member 652 filling in parts of the opening 651. The height of the filling member 652 is substantially perpendicular to the first axis (X-axis) and the second axis (Y-axis), and is smaller than that of the protrusion 62.

When moisture gathers at the edges of the optical film 60, the filling members 652 of the barrier member prevent the moisture from entering the grooves 63 of the optical film 60. The filling member 652 and the protrusion 62 have different heights, and the moisture has insufficient surface tension to enter the grooves 63.

Figure 7:
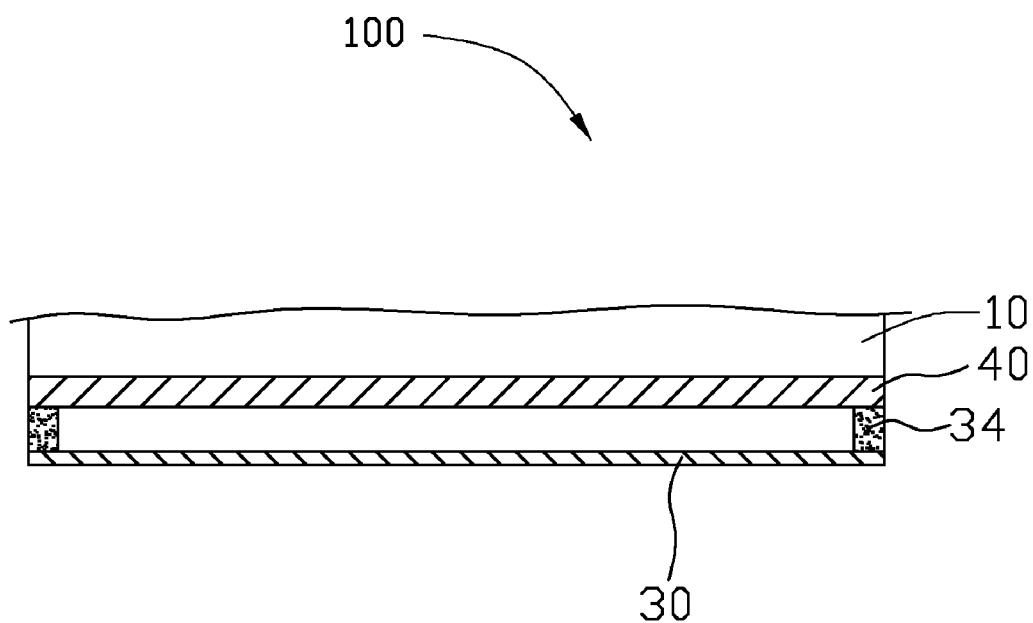
FIG. 7 is an assembled, isometric view of part of a liquid crystal display as disclosed, including a display board, a first optical film, and a second optical film.

Referring to FIG. 7, a liquid crystal display 100 includes a display board 10, a first optical film 30, and a second optical film 40 superposed with the first optical film 30. The second optical film 40 is arranged between the display board 10 and the first optical film 30. The first optical film 30 may be replaced by the optical film 50, or the optical film 60 as other embodiments. In this illustrated embodiment, the first optical film 30 is the first embodiment. The second optical film 40 may be a diffusion film contacting the optical film 30. The protrusions 32 of the optical film 30, the second optical film 40, and the barrier members 34 of the optical film 30 form an enclosed space, thus, moisture is prevented from entering the liquid crystal display 100, maintaining improved display quality thereof.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An optical film, comprising: an outer surface; a plurality of protrusions protruding from the outer surface and extending substantially parallel to a first axis; a plurality of grooves formed between neighboring protrusions; and two barrier members arranged at opposite sides of the optical film substantially parallel to a second axis, which is substantially perpendicular to the first axis; and preventing each groove from communicating with the exterior, wherein the barrier members are integrally formed with the optical film.

2. The optical film of claim 1, wherein the barrier members are filled in and enclosing the opposite groove.

3. The liquid crystal display of claim 1, wherein the barrier members are plastic material.

4. A liquid crystal display, comprising: a display board; a first optical film; and a second optical film arranged between the first optical film and the display board; wherein the first optical film comprises: an outer surface; a plurality of protrusions protruding from the outer surface and extending substantially parallel to a first axis; a plurality of grooves formed between neighboring protrusions; and two barrier members arranged at opposite sides of the optical film substantially parallel to a second axis, which is substantially perpendicular to the first axis and preventing each slot from communicating with the exterior, wherein the barrier members are integrally formed with the optical film.

5. The liquid crystal display of claim 4, wherein the barrier members are filled in and enclosing the opposite ends of each groove.

6. The liquid crystal display of claim 4, wherein the barrier members are plastic material.

\* \* \* \* \*